United States Patent
Suetsugu

(10) Patent No.: US 12,450,585 B2
(45) Date of Patent: Oct. 21, 2025

(54) SHOPPING PAYMENT SYSTEM AND SHOPPING BASKET

(71) Applicant: Katsunori Suetsugu, Tokyo (JP)

(72) Inventor: Katsunori Suetsugu, Tokyo (JP)

( * ) Notice: Subject to any disclaimer, the term of this patent is extended or adjusted under 35 U.S.C. 154(b) by 232 days.

(21) Appl. No.: 18/059,019

(22) Filed: Nov. 28, 2022

(65) Prior Publication Data

US 2023/0297991 A1    Sep. 21, 2023

(30) Foreign Application Priority Data

Dec. 16, 2021 (JP) .................. 2021-204407

(51) Int. Cl.
*G06Q 20/20* (2012.01)

(52) U.S. Cl.
CPC .......... *G06Q 20/208* (2013.01); *G06Q 20/204* (2013.01)

(58) Field of Classification Search
CPC .... G06Q 20/208; G06Q 20/204; G06Q 20/20; G06Q 20/18; G07G 1/0018; G07G 1/0054; G07G 1/0072; G07G 1/12; G07G 3/003

See application file for complete search history.

(56) References Cited

U.S. PATENT DOCUMENTS 10,552,814 B2 *  2/2020  Volta .................... G07G 1/0054
10,800,440 B2 * 10/2020  Li ....................... B62B 3/1424

(Continued)

FOREIGN PATENT DOCUMENTS

JP    H05135277 A    6/1993
JP    H07141569 A    6/1995

(Continued)

OTHER PUBLICATIONS

Li, Ruinian, et al. "IoT applications on secure smart shopping." 2016 International Conference on Identification, Information and Knowledge in the Internet of Things (IIKI). IEEE, 2016. (Year: 2016).*

(Continued)

*Primary Examiner* — Nathan A Mitchell
(74) *Attorney, Agent, or Firm* — Rosenberg, Klein & Lee

(57) ABSTRACT

Provided is a shopping payment system and shopping basket that allow for correct payment of the purchase price of products in a short time. The shopping payment system includes a product database that store the product identification codes of products, the prices of the products, and the weights of the products such that each of the product identification codes for identifying each product, each of prices of the product, and each of weights of the product are associated with each other, a product identification code acquisition unit that acquires the product identification code of a product read before the product is put into a shopping basket, a registered weight acquisition unit that acquires the weight of the product associated with the product identification code acquired by the product identification code acquisition unit 201, a measured weight acquisition unit that acquires the measured value of the total weight of one or more product put in the shopping basket, a product price payment unit that when the total weight of the products acquired by the registered weight acquisition unit and the measured value of the total weight of the products acquired by the measured weight acquisition unit 203 are matched, pays the purchase price of the products, and an alarm output unit that when the weights are not matched, outputs an alarm message.

2 Claims, 6 Drawing Sheets

(56) References Cited

U.S. PATENT DOCUMENTS

| | | | | |
|---|---|---|---|---|
| 2004/0073489 A1* | 4/2004 | Varatharajah | .......... | G06Q 20/20 |
| | | | | 705/16 |
| 2009/0212102 A1* | 8/2009 | Connell, II | ............ | G06F 18/22 |
| | | | | 235/375 |
| 2017/0158215 A1* | 6/2017 | Phillips | ................. | B62B 5/0096 |
| 2020/0275059 A1* | 8/2020 | De Bonet | ............ | G06V 10/141 |
| 2022/0157134 A1* | 5/2022 | Sriraman | ............. | G07G 1/0072 |
| 2022/0172189 A1* | 6/2022 | Nagamori | ............ | G07G 1/0072 |
| 2022/0309485 A1* | 9/2022 | Hamada | ............. | G06Q 30/0633 |
| 2024/0249342 A1* | 7/2024 | Malgarini | ............. | G06Q 30/06 |

FOREIGN PATENT DOCUMENTS

| | | | | |
|---|---|---|---|---|
| JP | 2003022478 A | | | 1/2003 |
| JP | 2007034789 A | * | | 2/2007 |
| JP | 2016177725 A | | | 10/2016 |
| JP | 2017228139 A | | | 12/2017 |
| WO | 03054822 A1 | | | 7/2003 |

OTHER PUBLICATIONS

Office Action which was issued to Japanese counterpart application No. 2021-204407 issued on Mar. 10, 2022 with English Translation.
Office Action which was issued to Japanese counterpart application No. 2021-204407 issued on Jul. 25, 2022 with English Translation.
Office Action which was issued to Japanese counterpart divisional application No. 2022-071092 issued on Jul. 25, 2022 with English Translation.
Office Action which was issued to Japanese counterpart divisional application No. 2022-071092 issued on Oct. 4, 2022 with English Translation.

\* cited by examiner

SHOPPING PAYMENT SYSTEM AND SHOPPING BASKET

TECHNICAL FIELD

The present t invention relates to a shopping payment system and shopping basket.

BACKGROUND ART

Conventionally, when a customer does shopping in a retail store such as a supermarket, clothing store, or variety store, the customer holds desired products with a hand or puts them into a shopping basket and carries them to a cash register around which a POS terminal or the like is placed. Then, a cashier scans the barcodes, QR codes (registered trademark), or the like of the products together, and the POS terminal or the like calculates the total amount of the products. Then, the customer pays the amount using cash or credit card. In this case, it may take time for the cashier to scan the barcodes of the products together, and persons waiting for checkout may make a long line in front of the cash register.

To solve such a problem, for example, Japanese Unexamined Patent Application Publication (Translation of PCT Application) No. 2015-524947 discloses a technology that, when a customer puts products into a shopping cart, detects a change in weight using a weight sensor mounted on the shopping cart and reads RFID tags attached to the products using an RFID reader in place of scanning the products together at a cash register.

See Japanese Unexamined Patent Application Publication (Translation of PCT Application) No. 2015-524947, Japanese Unexamined Patent Application Publication Nos. 2016-177725, 2003-22478, 2007-34789, Hei 07-141569, Hei 5-135277, and 2017-228139, and Republished WO2003/054822.

SUMMARY OF INVENTION

However, the technology of Japanese Unexamined Patent Application Publication (Translation of PCT Application) No. 2015-524947 depends on the detection function of the weight sensor and the scan function of the RFID reader. If a problem occurs in these functions, this technology may fail to accurately identify the products, making it difficult to quickly pay the purchase price of the products.

As related art, Japanese Unexamined Patent Application Publication No. 2016-177725 describes a data processing apparatus that assists in payment of shopping in a store by determining whether a product put in a basket and a product identification code read by a reader are matched on the basis of measurement data measured by a weight sensor and, when it is determined that they are not matched, outputting an error notification to a customer.

Japanese Unexamined Patent Application Publication No. 2003-22478 discloses that a server compares the total weight of products in a shopping basket measured by the weight sensor of a client with product weight information and, when they are not matched, outputs a barcode reading error notification to the client.

Japanese Unexamined Patent Application Publication No. 2007-34789 describes a technology that checks whether there is a fault in a measurement unit mounted on the container basket of a shopping cart by temporarily transferring products in the shopping cart to the container of a payment unit and comparing a value measured by a measurement unit mounted on the container of the payment unit and a value measured by the measurement unit mounted on the shopping cart.

Japanese Unexamined Patent Application Publication No. Hei 07-141569 describes a technology that issues an alarm when an increase is made in the total weight of products in a container with the product codes not read and sends error information when the alarm is continuously issued over a predetermined time due to no reduction in the increased weight.

Japanese Unexamined Patent Application Publication No. Hei 5-135277 describes a cash register control system installed in a store or the like that, when a barcode attached to a product is read by a barcode reader, unlocks an open/close lid mounted on the product inlet of a basket.

Japanese Unexamined Patent Application Publication No. 2017-228139 describes a POS apparatus that changes the lid of a container containing products from a close-state to an open-state after payment is complete and changes the lid from the open-state to a close-state when a subsequent predetermined time elapses.

Republished WO2003/054822 describes a technology that controls the lid of a basket body so that the lid closing the basket body is automatically opened when the barcode of a product is read and the lid is automatically closed when a predetermined time elapses.

The present invention has been made in view of the above problems, and an object thereof is to provide a shopping payment system and shopping basket that allow for correct payment of the purchase price of products in a short time.

To accomplish the above object, a shopping payment system according to one aspect of the present invention is shopping payment system for paying a purchase price of a product put in a shopping basket in a store. The shopping payment system includes a product information storage unit configured to store product identification codes for identifying products, prices of the products, and weights of the products such that each of the product identification codes for identifying each product, each of the prices of the product, and each of the weights of the product are associated with each other, a product identification code acquisition unit configured to acquire a product identification code of a product read before the product is put into the shopping basket, a registered weight acquisition unit configured to acquire a weight of the product previously stored in the product information storage unit so as to be associated with the product identification code acquired by the product identification code acquisition unit, a measured weight acquisition unit configured to acquire a measured value of a total weight of one or more products put in the shopping basket, a product price payment unit configured to, when a total weight of one or more products acquired by the registered weight acquisition unit and the measured value of the total weight of the products acquired by the measured weight acquisition unit are matched, pay a purchase price of the products, and an alarm output unit configured to, when a total weight of one or more products acquired by the registered weight acquisition unit and the measured value of the total weight of the products acquired by the measured weight acquisition unit are not matched, output an alarm message.

According to the one aspect of the present invention, the product identification code of the product read before the product is put into the shopping basket is acquired. This eliminates the need to read the product identification codes of products together at the cash register and allows for payment in a short time.

Also, when the total weight of the products acquired by the registered weight acquisition unit and the measured value of the total weight of the products acquired by the measured weight acquisition unit are matched, the purchase price of the product is paid. When they are not matched, an alarm message is outputted. Thus, payment is correctly performed.

In the above shopping payment system, weight sensors are disposed on the shopping basket and a cash register table of the store. The measured weight acquisition unit acquires the measured value of the total weight of the products put in the shopping basket from each of the weight sensors disposed on the shopping basket and the cash register table. When the acquired measured values of the weight are not matched, the alarm output unit outputs an alarm message.

According to the one aspect of the present invention, the total weight of the products put in the shopping basket is acquired from each of the weight sensors disposed on the shopping basket and cash register, and whether the weights are matched is checked. Thus, the purchase price of the product is correctly paid.

A shopping payment system according to another aspect of the present invention is a shopping payment system for paying a purchase price of a product put into a shopping basket in a store. The shopping payment system includes a product information storage unit configured to store product identification codes for identifying products, prices of the products, and weights of the products such that each of the product identification codes for identifying each product, each of the prices of the product, and each of the weights of the product are associated with each other, a product identification code acquisition unit configured to acquire a product identification code of a product read before the product is put into the shopping basket, a registered weight acquisition unit configured to acquire a weight of the product previously stored in the product information storage unit so as to be associated with the product identification code acquired by the product identification code acquisition unit, a measured weight acquisition unit configured to acquire a measured value of a total weight of one or more products put in the shopping basket measured by a weight sensor disposed on the shopping basket, an alarm output unit configured to, when a total weight of one or more products acquired by the registered weight acquisition unit and the measured value of the total weight of the products acquired by the measured weight acquisition unit are not matched, output an alarm message, a notification unit configured to, when the measured value of the total weight of the products acquired by the measured weight acquisition unit is increased compared to a measured value preceding the measured value multiple times with no product identification code being acquired by the product identification code acquisition unit and thus the measured value of the total weight of the products is continuously increased, output a notification to an organization in charge of security or a communication terminal owned by an individual, and a product price payment unit configured to, when a total weight of one or more products acquired by the registered weight acquisition unit and the measured value of the total weight of the products acquired by the measured weight acquisition unit are matched at a cash register, pay a purchase price of the product. A weight sensor is disposed on a cash register table of the store. The measured weight acquisition unit acquires the measured value of the total weight of the products put in the shopping basket from each of the weight sensors disposed on the shopping basket and the cash register table. When the acquired measured values of the total weight are not matched, the alarm output unit outputs an alarm message.

The other aspect of the present invention prevents fraud and allows for correct payment of the purchase price of the product in a short time.

A shopping basket according to yet another aspect of the present invention is a shopping basket for putting in a product in a store. The shopping basket includes a basket body having an opening in a top surface thereof, a lid configured to open and close the opening, a lid open/close controller configured to control open/close of the lid, and a reader configured to read a product identification code for identifying a product. When a product identification code is read by the reader with the opening closed, the lid open/close controller controls the lid to open the opening. When no product identification code is read by the reader continuously for a predetermined time with the opening opened, the lid open/close controller controls the lid to close the opening. The shopping basket further includes an alarm output unit configured to, when a measured value of a total weight of one or more products put into the basket body when the opening is open and the total weight of the products previously registered so as to be associated with each product identification code for identifying the product are not matched, output an alarm message and a notification unit configured to, when a measured value of a total weight of one or more products put in the basket body is continuously increased with the opening opened and with no product identification code being read by the reader, output a notification to an organization in charge of security or a communication terminal owned by an individual.

The yet other aspect of the present invention prevents fraud and allows for correct payment of the purchase price of the product.

A shopping basket according to still yet another aspect of the present invention is a shopping basket for putting in a product in a store. The shopping basket includes a basket body having an opening on a top surface thereof, a lid configured to open and close the opening, a lid open/close controller configured to control open/close of the lid, and a reader configured to read a product identification code for identifying a product. When a product identification code is read by the reader with the operated closed, the lid open/close controller controls the lid to open the opening.

According to the still yet other aspect of the present invention, when the opening of the basket body is closed, the opening is not opened unless a product identification code is read by the reader, and therefore it is difficult to put a product into the basket body. This prevents fraud and allows for correct payment of the purchase price of the product.

In the above shopping basket, when the lid is open continuously for a predetermined time with no product identification code being read by the reader, the lid open/close controller controls the lid to close the opening.

According to the still yet other aspect of the present invention, the time in which the opening is open can be reduced as much as possible. This can lead to a reduction in the probability that a product may be put into the basket body with no product identification code being read, prevention of fraud, and correct payment of the purchase price of the product.

The above shopping basket further includes an alarm output unit configured to, when a measured value of a total weight of one or more products put in the basket body and the total weight of the products previously registered so as to be associated with each product identification code for identifying the product are not matched, output an alarm message.

According to the still yet other aspect of the present invention, when the measured value of the total weight of the products put in the basket body and the total weight of the products previously registered so as to be associated with each product identification code for identifying the product are not matched, an alarm message is outputted. This prevents fraud and allows for correct payment of the purchase price of the product.

DESCRIPTION OF EMBODIMENTS

Now, an embodiment of the present invention will be described in detail with reference to the drawings.

Figure 1:
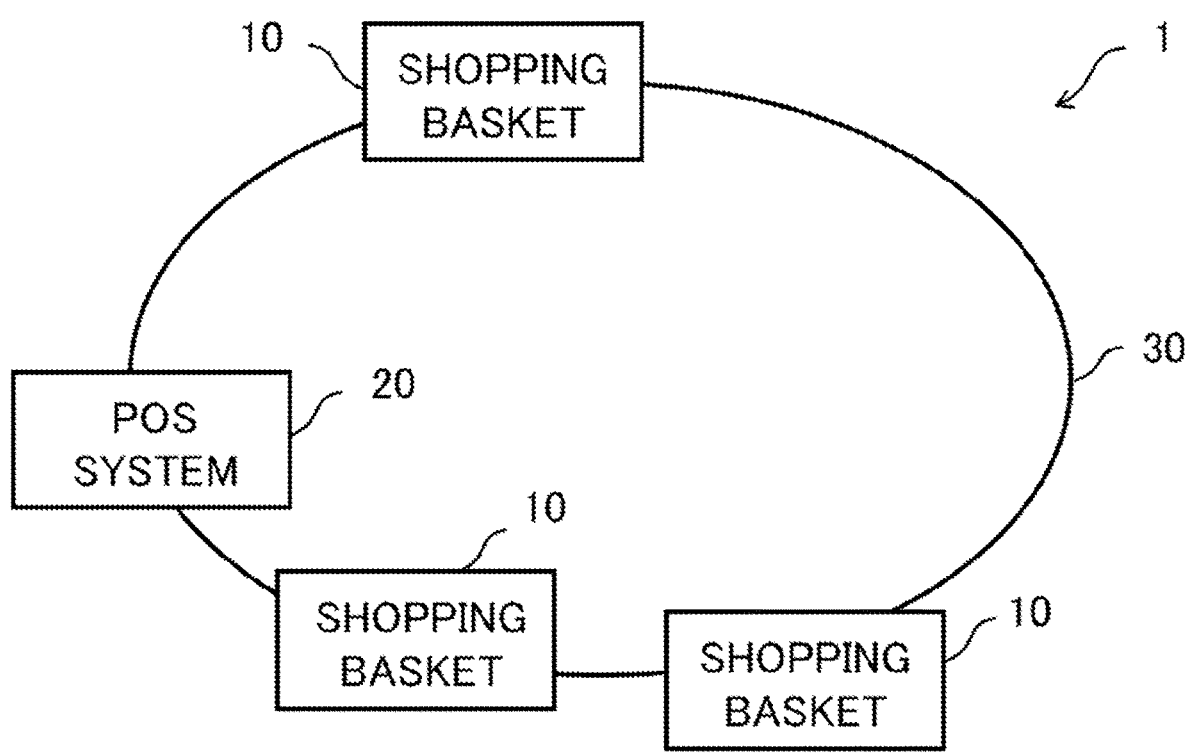
FIG. 1 is a diagram showing the overall configuration of a shopping payment system according to an embodiment of the present invention.

FIG. 1 is a diagram showing the overall configuration of a shopping payment system 1 according to the embodiment of the present invention. The shopping payment system 1 includes shopping baskets 10 into which customers put products in a store such as a retail store or supermarket, a POS system 20 for product price payment placed around the cash register of the store, and a communication network 30 such as a wireless communication network, the Internet, or a block chain network that communicatively connects these components.

Note that a shopping basket 10 may be mounted on a cart.

Figure 2:
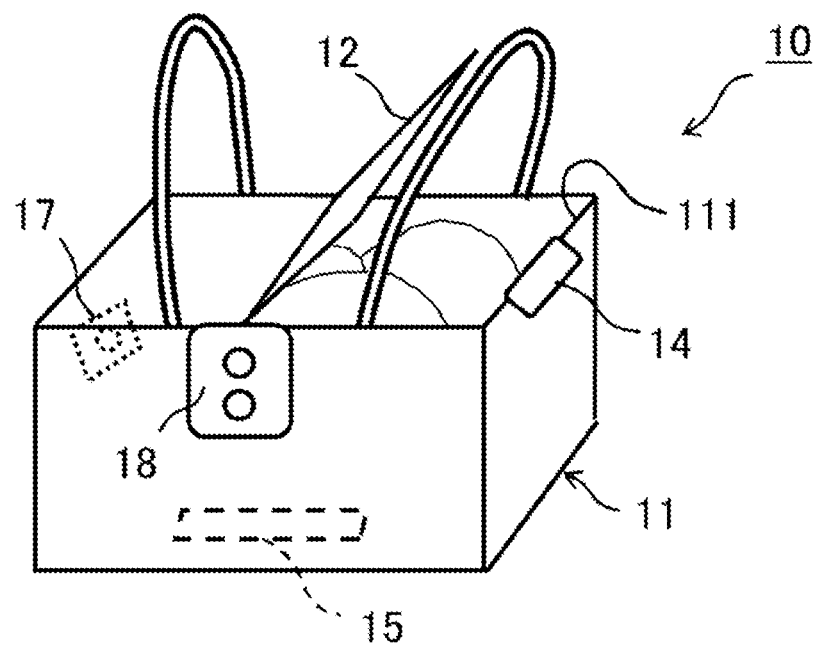
FIG. 2 is a perspective view of a shopping basket according to the present embodiment.

FIG. 2 is a perspective view of a shopping basket 10. The shopping basket 10 includes a basket body 11 having a rectangular opening 111 in a portion of the top surface thereof. A lid 12 is rotatably mounted on a side of the opening 111 through a hinge or the like (not shown) and opens and closes the opening 111.

A reader 14 for reading QR codes is mounted on a side opposite to the side on which the hinge or the like of the opening 111 is mounted. In the present embodiment, QR code is affixed to a product, and the QR code represents product identification code for identifying the product, the price of the product, the weight of the product, and the like.

Objects read by the reader 14 are not limited to QR codes and may be, for example, RFID tags or barcodes. The reader 14 is not limited to a QR code reader and may be an RFID reader or barcode reader.

A weight sensor 15 for measuring the weight of products put in the shopping basket 10 is mounted on the bottom of the shopping basket 10. A camera 17 for capturing images of the inside of the basket is mounted on an inner side surface of the shopping basket 10.

A controller 18 is mounted on the shopping basket 10. The controller 18 includes, as hardware, a CPU, memory, a motor, a speaker, an input/output interface, a wireless communication interface, and the like. Various types of data and programs for controlling the shopping basket 10 are stored in the memory of the controller 18. The programs stored in the memory include a program for controlling the operation of the lid 12, a program for outputting an alarm sound, and a program for communicating with the reader 14, weight sensor 15, camera 17, POS system 20, and the like.

Figure 3:
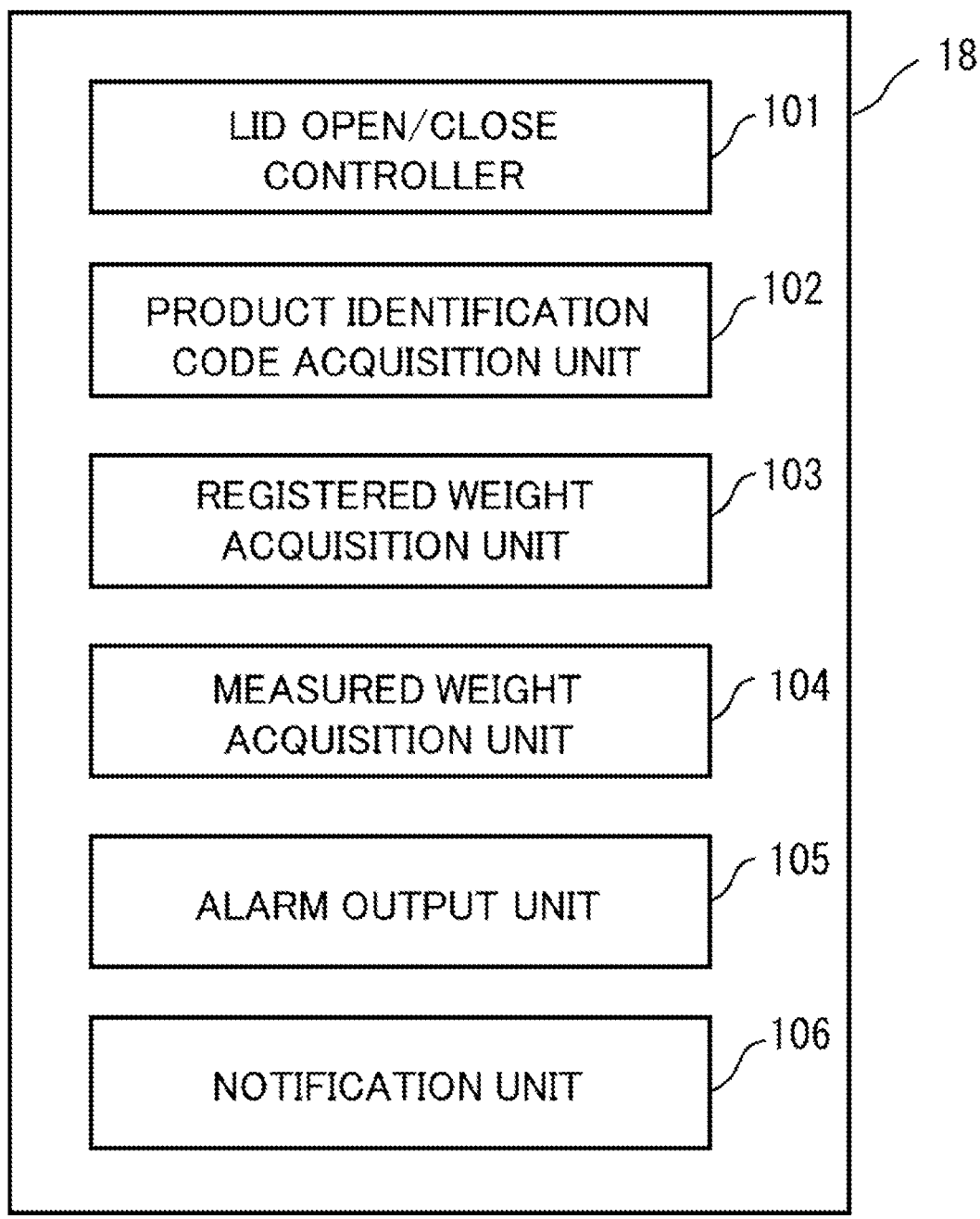
FIG. 3 is a diagram showing the functional configuration of a controller of the shopping basket according to the present embodiment.

When the CPU executes a program stored in the memory, functions shown in FIG. 3 are implemented in the controller 18 of the shopping basket 10.

When the QR code of a product is read by the reader 14 with the opening 111 closed, a lid open/close controller 101 controls the lid 12 to open the opening 111. This prevents a product whose QR code has yet to be read from entering the shopping basket 10 and thus prevents fraud and allows for correct payment of the purchase price of products.

When the lid 12 is open continuously for a predetermined time with no QR code being read by the reader 14, the lid open/close controller 101 controls the lid 12 to close the opening 111. The "predetermined time" may be set, for example, by operating an operation button disposed on the controller 18. Thus, the time in which the opening 111 is open can be reduced as much as possible. This can lead to a reduction in the probability that a product may be put into the shopping basket without being scanned (that is, with a QR code affixed to the product not being read), prevention of fraud, and correct payment of the purchase price of the product.

A product identification code acquisition unit 102 acquires a product identification code. Specifically, a product identification code acquisition unit 102 analyzes the QR code of the above-mentioned product read by the reader 14 of the shopping basket 10 before the product is put into the shopping basket 10 and acquires the product identification code of the product from the QR code.

A registered weight acquisition unit 103 acquires the previously registered weight of the product identified by the product identification code acquired by the product identification code acquisition unit 201. In the present embodiment, the QR code of the product read by the reader 14 includes the weight of the product. For this reason, the registered weight acquisition unit 103 analyzes the QR code and acquires the weight of the product from the QR code. Note that if the QR code does not include the weight of the product, the registered weight acquisition unit 103 may acquire the weight of the product from a product database 40 (to be discussed later).

A measured weight acquisition unit 104 acquires the measured value of the total weight of one or more products put in the shopping basket 10 from the weight sensor 15.

The measured weight acquisition unit 104 may acquire the measured value at every constant time or each time the QR code of the product is scanned.

When the measured value of the total weight of one or more products put in the shopping basket 10 and the total weight of the products previously registered so as to be associated with each product identification code are not matched, an alarm output unit 105 outputs an alarm message from the speaker. Note that whether they are matched may be determined taking into consideration some measurement error or an error based on the weight of a package except for the product.

Note that each time a QR code of a product is scanned, the controller 18 may obtain the measured value of the weight of the product from the difference between the preceding and current measured values acquired by the measured weight acquisition unit 104, and the alarm output unit 105 may output an alarm message from the speaker when the measured value of the weight of the product and the weight of the product previously registered so as to be associated with the product identification code are not matched.

Specifically, it is assumed that a user scans a cake of tofu having a weight of 100 g and then puts it into the shopping basket 10 but puts another cake of tofu into the shopping basket 10 without scanning it. In this case, the measured value of the weight of the cakes of tofu put in the shopping basket 10 is 200 g, and the weight previously registered in the QR code of the scanned cake of tofu is 100 g. The measured value and the registered value are not matched. For this reason, the alarm output unit 105 determines that there is a yet-to-be-scanned product and outputs an alarm message to that effect to the user. If the user has a misunderstanding, the user can correct the mismatch by scanning the yet-to-be-scanned other cake of tofu.

The "alarm message" may be an alarm sound from the speaker, or may be an alarm mark, alarm lamp, or the like.

When products are continuously put into the shopping basket 10 without being scanned, the controller 18 may determine that the products may be being shoplifted and output security/crime prevention information to that effect to a security firm.

Specifically, when products are continuously put into the shopping basket 10 with the opening 111 opened and with no product identification code being read by the reader 14 and thus the measured value of the weight of the products put in the basket body 11 is continuously increased, a notification unit 106 outputs a notification to that effect to an organization in charge of security such as a security firm, or a communication terminal owned by an individual.

Figure 4:
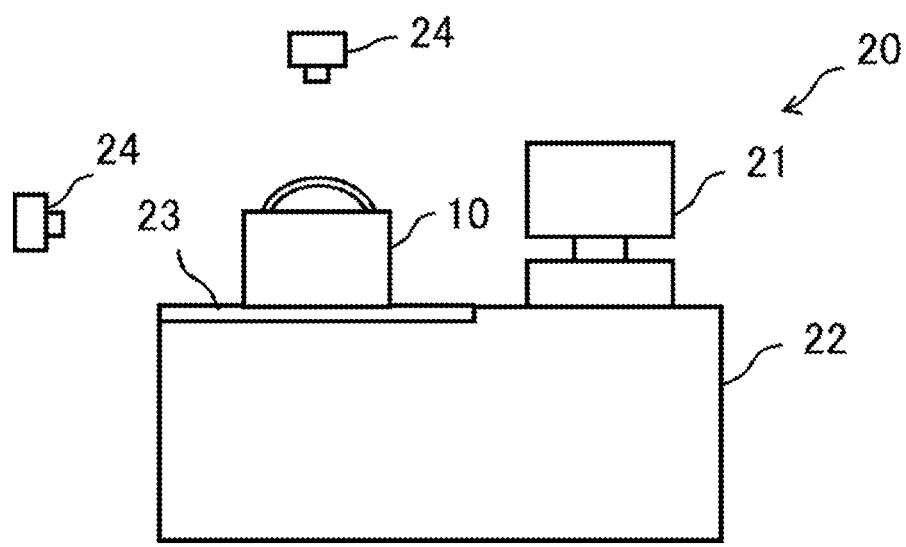
FIG. 4 is a drawing showing a POS system placed in a cash register area.

FIG. 4 is a drawing showing the POS system 20 placed in a cash register area. As shown in FIG. 4, the POS system 20 includes a POS terminal 21 and a cash register table 22 for placing the shopping basket 10. A weight sensor 23 is disposed on the top surface of the cash register table 22. A camera 24 for monitoring fraud by capturing images of the cash register area is disposed around the cash register table 22.

The POS terminal 21 includes, as hardware, a CPU, memory such as RAM and ROM, a communication interface, a display, and a payment card reader. Various types of software such as data and programs are stored in the memory. The data stored in the memory of the POS terminal 21 includes the product database 40 for managing products in the store in which the POS terminal 21 is placed.

Product identification codes for identifying the products, the prices of the products, and the weights of the products are stored in the product database 40 such that each of the product identification codes for identifying each product, each of the prices of the product, and each of the weights of the product are associated with each other. Note that the product database 40 may be managed by another server.

The programs stored in the memory of the POS terminal 21 include a program for acquiring various types of information from the controller 18 of each shopping basket 10, a program for acquiring the measured value of the weight of products put in each shopping basket 10 from the weight sensor 23 thereof, a program for paying the purchase price of products, a program for outputting an alarm message, and the like.

Figure 5:
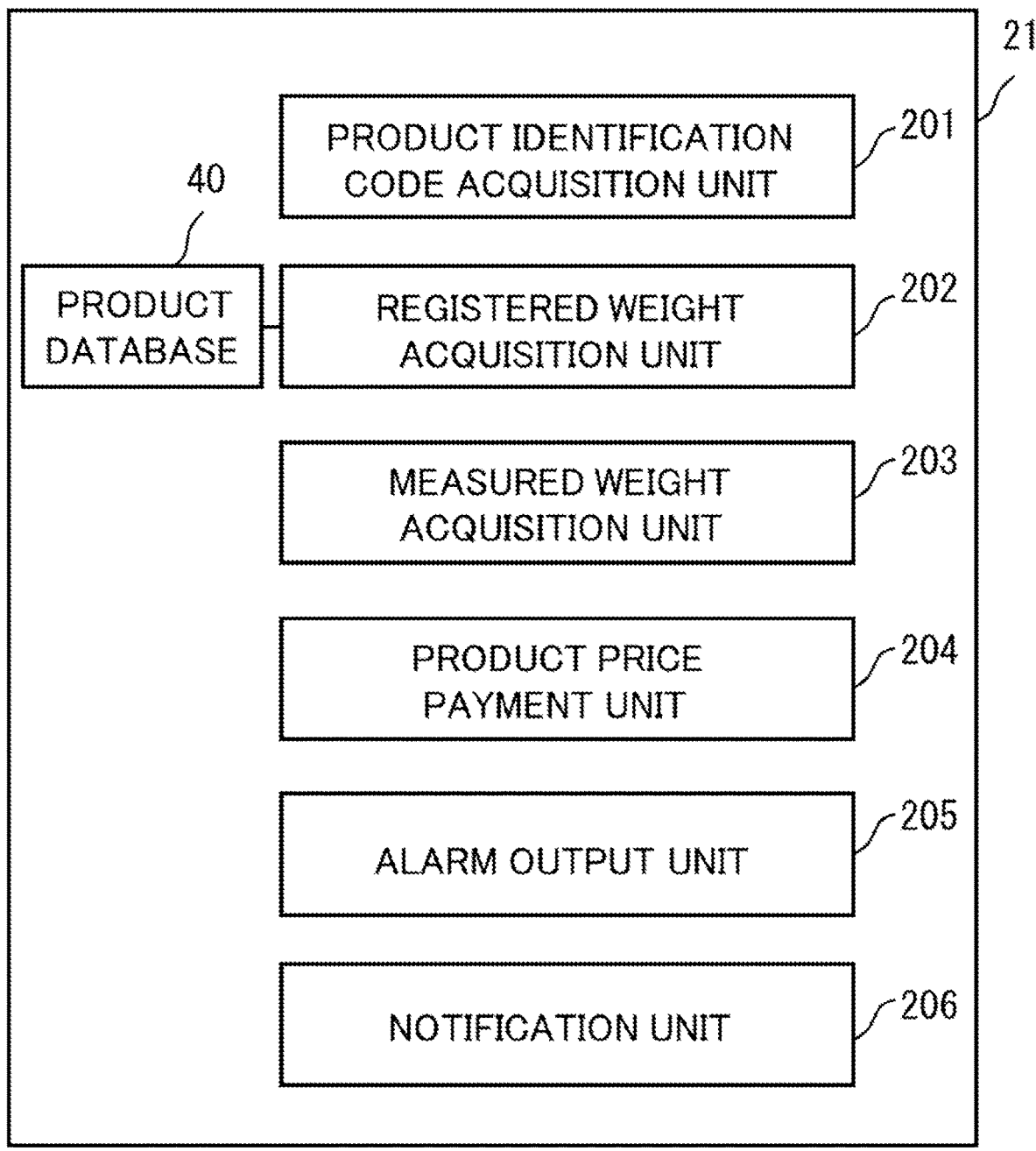
FIG. 5 is a diagram showing the functional configuration of a POS terminal included in the POS system.

When the CPU of the POS terminal 21 executes a program stored in the memory, functions shown in FIG. 5 are implemented in the POS terminal 21.

A product identification code acquisition unit 201 acquires, from the reader 14 of the shopping basket 10, a product identification code of a product read by the reader 14 before the product are put into the shopping basket 10.

A registered weight acquisition unit 202 acquires weight stored in the product database 40 so as to be associated with the product identification code acquired by the product identification code acquisition unit 201.

A measured weight acquisition unit 203 acquires the measured value of the total weight of one or more product put in the shopping basket 10 from the weight sensor 23 of the cash register table 22 when the shopping basket 10 is placed on the cash register table 22.

Note that the measured weight acquisition unit 203 may acquire the measured value of the total weight of products put in the shopping basket 10 from the weight sensor 15 of the shopping basket 10.

When the total weight of one or more products acquired by the registered weight acquisition unit 202 and the measured value of the total weight of the products acquired by the measured weight acquisition unit 203 are matched, a product price payment unit 204 pays the price of the products.

When the measured weight acquisition unit 203 acquires both the total weight measured value obtained by the weight sensor 23 of the cash register table 22 and the total weight measured value obtained by the weight sensor 15 of the shopping basket 10 and both measured values are matched, the product price payment unit 204 pays the price of the products.

Any payment means such as cash, credit card, electronic money, or cryptocurrency may be used.

When the previously registered weight of one or more products acquired by the registered weight acquisition unit 202 and the measured value of the total weight of the products acquired by the measured weight acquisition unit 203 are not matched, an alarm output unit 205 outputs an alarm message.

When the measured weight acquisition unit 203 acquires both the measured value obtained by the weight sensor 15 of the shopping basket 10 and the measured value obtained by the weight sensor 23 of the cash register table 22 and both measured values are not matched, the alarm output unit 205 outputs an alarm message.

When the measured value of the total weight of one or more products acquired by the measured weight acquisition unit 203 is increased compared to a measured value preceding the measured value multiple times with no product identification code being acquired by the product identification code acquisition unit 201 and thus the measured value of the total weight of the products is continuously increased, a notification unit 206 outputs a notification to an organization in charge of security or a communication terminal owned by an individual.

Figure 6:
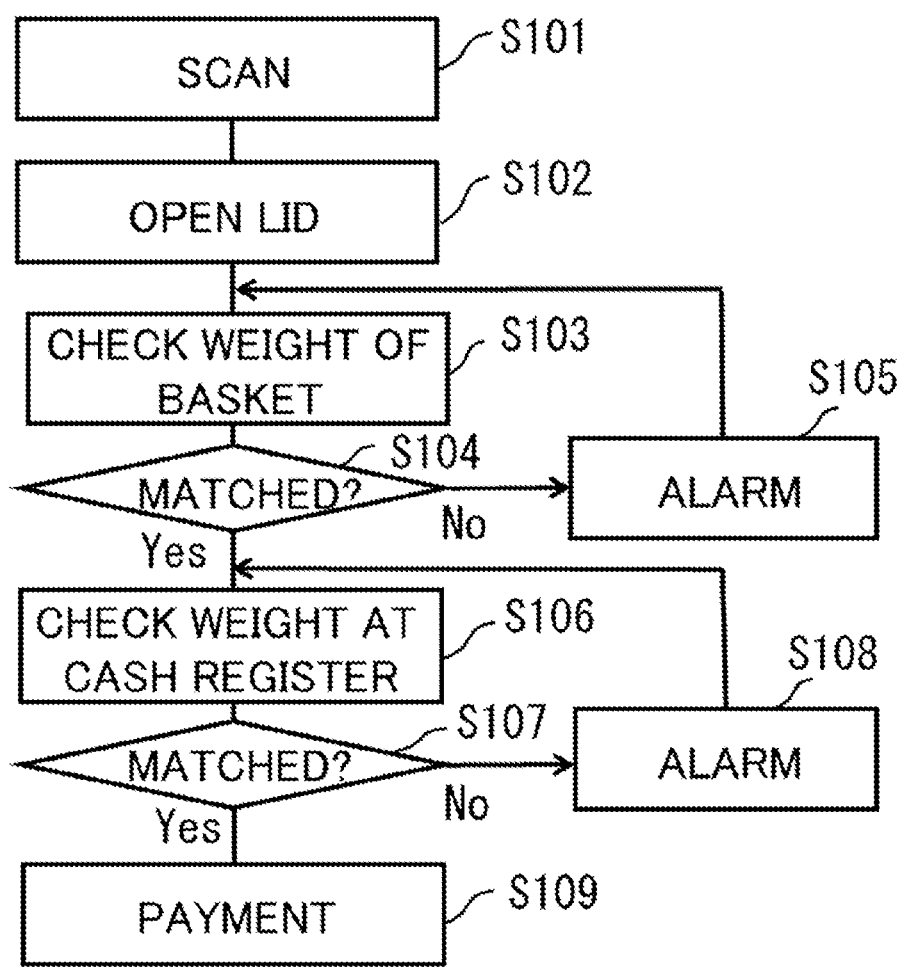
FIG. 6 is a flowchart showing a payment process performed by the shopping payment system according to the present embodiment.

Referring next to FIG. 6, a process in which a user puts products into a shopping basket 10 and pays the purchase price of the products in a store in the shopping payment system 1 having the above configuration will be described.

First, the user goes to showcases on which the desired products are displayed, with the shopping basket 10 in the store. The user then picks up a product from a showcase and scans the QR code of the product using the reader 14 of the shopping basket 10 so that the reader 14 reads the QR code (step S101). The lid open/close controller 101 detects that the QR code has been read and controls the lid 12 so that the opening 111 is opened (step S102). The user then puts the scanned product into the basket body 11 through the opened opening 111.

The registered weight acquisition unit 103 of the shopping basket 10 analyzes the read QR code and acquires the weight of the product from the QR code. The measured weight acquisition unit 104 acquires the measured value of the weight from the weight sensor 15.

Each time a product is put into the basket body 11, the controller 18 of the shopping basket 10 determines whether the weight of the scanned product acquired by the registered weight acquisition unit 103 and the measured value of the product acquired by the measured weight acquisition unit 104 are matched (step S103). Note that the measured value of the weight of the product put into the shopping basket 10 this time may be obtained from the difference between the preceding and current measured values. When the weights are not matched (step S104: No), the controller 18 outputs an alarm message from the speaker (step S105). When the alarm message is outputted, the user checks whether missed reading or double scan of the QR code, or the like has occurred and reads the QR code again.

On the other hand, when the weights are matched (step S104: Yes), the user carries the shopping basket 10 to the cash register and places it on the cash register table 22 so that the POS terminal 21 checks the weight (step S106).

Specifically, the measured weight acquisition unit 203 of the POS terminal 21 acquires the measured value of the weight of the products measured by the weight sensor 23 of the cash register table 22. The registered weight acquisition unit 202 acquires the sum of the previously registered weight of each product associated with the product identification code read by the reader 14 of the shopping basket 10 thus far. The previously registered weight of each product may be the weight included in each QR code read by the reader 14 of the shopping basket 10, or may be the weight stored in the product database 40. The POS terminal 21 then determines whether the total weight of the products acquired by the registered weight acquisition unit 21 and the measured value of the total weight of the products acquired by the measured weight acquisition unit 203 are matched.

When the weights are not matched (step S107: No), the alarm output unit 205 outputs an alarm message (step S108). When the weights are matched (step S107: Yes), the product price payment unit 204 pays the price of the products (step S109). When the user passes the cash register, the shopping payment system 1 checks whether there is fraud by taking photographs using the cameras 17 and 24.

As described above, each time a product is put into the shopping basket 10, the QR code is scanned so that the product identification code is read. This eliminates the need to scan the QR codes of a great number of products together at the cash register and reduces errors, as well as reduces the waiting time at the cash register and allows for payment of the price of the products in a short time.

Also, when the previously registered weight of the products and the measured value of the products are matched, the purchase price of the products is paid. That is, the purchase price of the products is paid correctly.

The above embodiment is illustrative only, and the present invention can also be carried out by making various modifications to the embodiment without departing from the spirit and scope of the invention as set forth in the claims.

For example, the lid 12 for opening and closing the opening 111 of each shopping basket 10 need not be of a rotation-type and may be of a slide-type. Also, the reader 14 of the shopping basket 10 may have the functions of the controller 18, or the POS system 20 may have the functions of the controller 18.

Also, the communication system of the shopping payment system 1 may be peer-to-peer (P2P) communication or client-server communication, communication using a distributed storage blockchain, or a combination thereof.

If RFID tags are used as product identification codes, a RFID reading gate or RFID reader may be placed at the cash register so that double check can be performed. Although the QR codes may be read again at the cash register so that double check can be performed, it is preferable not to do so because it takes time.

An IoT device may be used in the store to collect information, and the collected information may be managed using a computer.

The present invention can be used when a user purchases products in any real store such as a food supermarket, clothing store, and variety store.

What is claimed is:

1. A shopping payment system for paying a purchase price of a product put in a shopping basket in a store, comprising:
    a product information storage unit configured to store product identification codes for identifying products, prices of the products, and weights of the products such that each of the product identification codes for identifying each product, each of the prices of the product, and each of the weights of the product are associated with each other;
    a product identification code acquisition unit configured to acquire a product identification code of a product read before the product is put into the shopping basket;
    a registered weight acquisition unit configured to acquire a weight of the product previously stored in the product information storage unit so as to be associated with the product identification code acquired by the product identification code acquisition unit;
    a measured weight acquisition unit configured to acquire a measured value of a total weight of one or more products put in the shopping basket;
    a product price payment unit configured to, when a total weight of one or more products acquired by the registered weight acquisition unit and the measured value of the total weight of the products acquired by the measured weight acquisition unit are matched, pay a purchase price of the products; and
    an alarm output unit configured to, when a total weight of one or more products acquired by the registered weight acquisition unit and the measured value of the total weight of the products acquired by the measured weight acquisition unit are not matched, output an alarm message,
    wherein weight sensors are disposed on the shopping basket and a cash register table of the store,
    wherein when the shopping basket is placed on the cash register table, the measured weight acquisition unit is configured to acquire the measured value of the total weight of the products put in the shopping basket concurrently from each of the weight sensors disposed on the shopping basket and the cash register table, and
    wherein when the measured values of the weight concurrently acquired from the weight sensor disposed on the shopping basket and from the weight sensor disposed on the cash register table are not matched to each other, the alarm output unit outputs an alarm message.

2. The shopping payment system of claim 1, further comprising a notification unit configured to, when the measured value of the total weight of the products acquired by the measured weight acquisition unit is increased compared to a measured value preceding the measured value with no product identification code being acquired by the product identification code acquisition unit a plurality of times and thus the measured value of the total weight of the products is continuously increased, output a notification to an organization in charge of security or a communication terminal owned by an individual.

* * * * *